United States Patent [19]

Gauer et al.

[11] Patent Number: 4,722,797

[45] Date of Patent: Feb. 2, 1988

[54] METHOD FOR REGENERATION OF A WATER SOFTENER

[75] Inventors: Gary W. Gauer, Cottage Grove; Duane D. Nowlin, New Brighton; Thomas J. Weber, Woodbury; Dennis G. Winberg, Cottage Grove, all of Minn.

[73] Assignee: Ecodyne Corporation, Chicago, Ill.

[21] Appl. No.: 771,481

[22] Filed: Sep. 3, 1985

Related U.S. Application Data

[63] Continuation of Ser. No. 545,873, Oct. 27, 1983, abandoned.

[51] Int. Cl.⁴ .............................................. B01J 49/00
[52] U.S. Cl. .................................... 210/662; 210/670; 210/687; 521/26
[58] Field of Search ...................... 210/670, 687, 96.1, 210/140, 141, 143, 190, 191, 662; 521/26

[56] References Cited

U.S. PATENT DOCUMENTS

| | | |
|---|---|---|
| 3,246,759 | 4/1966 | Matalon . |
| 3,687,289 | 8/1972 | Tischler . |
| 4,257,887 | 3/1981 | Rak et al. . |
| 4,320,010 | 3/1982 | Tucci et al. ........................ 210/96.1 |
| 4,379,057 | 4/1983 | Meiser et al. ........................ 210/141 |
| 4,426,294 | 1/1984 | Seal ..................................... 210/143 |

OTHER PUBLICATIONS

Lindsay, Know It All brochure.

*Primary Examiner*—Ivars Cintins
*Attorney, Agent, or Firm*—Neuman, Williams, Anderson & Olson

[57] ABSTRACT

A method and apparatus for selecting the quantity of salt to be used during each regeneration of a water softener system. The quantity of salt used during each regeneration is approximately equal to the quantity of salt needed to regenerate the resin bed to a preselected design capacity, which is less than the maximum capacity of the resin bed. The design exchange capacity is approximately equal to the exchange capacity of the resin bed at a particular salt dosage, wherein the exchange capacity of the bed at the particular salt dosage divided by the particular salt dosage is generally equal to or greater than 2850. The system is regenerated when at the end of any preselected time period, the percentage of the design capacity of the resin bed used since the last regeneration cycle exceeds a predetermined percentage.

In determining the salt dosage used during each regeneration cycle, the exchange capacity of the resin bed is determined for various salt dosages. The available exchange capacity of the resin bed is determined by subtracting the exchange capacity of the resin bed used since the last regeneration from the selected design capacity of the resin bed. The salt dosage used during each regeneration is approximately equal to the salt dosage of the resin bed at the design exchange capacity less the salt dosage of the resin bed at the available exchange capacity of the resin bed.

The apparatus of the present invention utilizes a microcomputer to automatically make the necessary calculations to determine when to regenerate the resin bed and to determined the proper salt dosage fill time to the brine tank prior to each regeneration. A turbine water meter located in the soft water outlet line measures the water usage since the last regeneration.

10 Claims, 2 Drawing Figures

METHOD FOR REGENERATION OF A WATER SOFTENER

This application is a continuation, of application Ser. No. 545,873, filed Oct. 27, 1983 now abandoned.

BACKGROUND OF THE INVENTION

The present invention relates to a novel method and apparatus for regenerating the water softening or conditioning material in an automatic water softener.

Water softening with ion exchange material such as resin particles or the like is well known in the art. During the softening process, or service cycle, the ion exchange resin particles acquire hardness inducing ions from the water in exchange for soft ions, or ions which do not induce hardness. After prolonged contact of the resin particles with raw water, their ion exchange capacity is diminished considerably and periodic regeneration of the resin particles must be accomplished, conventionally by contacting the resin particles with a brine solution, i.e., an aqueous solution of sodium chloride or potassium chloride or the like.

The ion exchange process and the regeneration of the ion exchange material are accomplished in a softener or resin tank of well known construction, while a separate brine tank is conventionally employed to manufacture brine for use during the regeneration cycle. When regeneration is initiated in the system, brine is drawn from the brine tank and passed through the bed of ion exchange material in the softener tank to reverse the exchange of ions and revitalize the bed by removing hardness inducing ions and replacing them with sodium ions, for example, from the brine solution.

The precise amount of brine which is required to regenerate a bed of ion exchange materials of predetermined volume, is dependent uon the extent to which the bed is exhausted during the service cycle. This, in turn, is dependent upon a number of factors, including: (1) the extent of hardness of the water being treated; and (2) the quantity of water treated during a service cycle. In order to enhance the economy of the system, it is desirable to precisely limit the amount of salt utilized in each regeneration cycle and the frequency of each regeneration cycle to the amount required.

Most water softeners are designed to regenerate on a predetermined timed cycle determined by taking into consideration the above-mentioned factors. Because of this, if a water softening system is subjected to either an abnormally high or low usage during a particular period of time, the water softening system will still regenerate itself during the predetermined regeneration cycle. In the instance of abnormally low usage, a waste of salt and water results, and in the instance of abnormally high usage, the water softening system is unable to adequately soften all of the water passing through the system.

There have been many proposed systems to solve the above mentioned problem. Such systems have been based upon utilizing means to detect the state of exhaustion of the resin bed or utilizing means to measure the quantity of water which has passed through the resin bed since the previous regeneration.

Examples of heretofore used systems which attempt to detect the state of exhaustion of the resin bed are disclosed in U.S. Pat. Nos. 3,246,759 and 4,257,887. These systems have a plurality of spaced electrode probes mounted in the resin bed to detect the condition of the resin bed, and when the condition is such that rejuvenation should occur, a control circuit is activated to command regeneration. These systems rely on the difference in conductivity of exhausted and rejuvenated resin particles. These systems have proved to be generally unreliable in operation, relatively expensive, and the salt usage is not always in direct proportion to the volume of soft water produced.

One example of a system which utilizes a means to measure the quantity of water which has passed through the bed is disclosed in U.S. Pat. No. 3,687,289. This system includes a metering device associated with the soft water line to meter a predetermined proportion of water from the soft water line. The metered water is directed to a chamber having an adjustable water storage capacity. The proportion of water metered from the soft water line is directly proportional to the storage capacity of a pump chamber. The water stored in the chamber is periodically directed to the brine storage tank. The brine storage tank includes means to activate a timer to signal the need for regeneration when the water level in the brine tank reaches a predetermined level. The proportion of water metered into the brine tank is adjusted dependent upon the hardness of the water being treated.

The above discussed water softener systems signal a regeneration as usage proceeds through an allocated amount of soft water. However, the actual time of regeneration is usually delayed to occur at night as is the custom. Therefore, a reserve capacity in the resin bed is required to provide soft water for the remaining portion of the day after the signal point is reached. The reserve point is typically selected to correspond with the point when approximately 70% of the capacity of the resin bed is reached. This large reserve is needed to maintain soft water service in the event that the signal point is reached early in the day. Although such water softener systems may be designed or adjusted to vary the reserve capacity of the resin bed, they will repeat thereafter with a fixed reserve capacity.

With the advent of micro-computer technology, a water softener system was recently designed which utilizes a micro-computer to adjust the reserve capacity from day to day in response to the usage encountered. The system includes a water meter turbine which determines the quantity of water passing through the resin bed. The micro-computer calculates the percentage of the capacity of the resin bed used since the last regeneration based upon the quantity and hardness of the water which has passed through the resin bed. The micro-computer employs an algorithm to make its calculations and decisions as time and water use accumulates. The algorithm allows a large reserve on early days following a regeneration and continues to reduce the amount of reserve capacity as more days of significant water usage go by since the last previous regeneration. At such time as the reserve capacity for that day is reached, the water softener is scheduled for regeneration that night and is regenerated with a preselected fixed quantity of salt.

A similar system to the system described immediately hereinabove utilizes a similar algorithm with additional criteria for reducing the probability of overrunning the variable reserve. This system determines and stores water usage averages for each particular day of the week. At the end of each day the calculated remaining reserve capacity in the resin bed is determined and compared with the stored water usage average for the next day. If the remaining reserve capacity is not adequate to meet the expected demands of the next day, the water softener is scheduled for regeneration that night with a preselected fixed quantity of salt.

The above described micro-computer systems utilize a variable reserve capacity and are able to schedule regenerations more in proportion to water usage and thereby reduce the reserve capacity of the resin bed at the time of regeneration more accurately than in prior systems. However, in both of these systems, a fixed quantity of salt is utilized during each regeneration. The quantity of brine solution which is directed through the resin bed is the same during each regeneration. Accordingly, in instances when the reserve capacity of the resin bed is relatively high at the time of regeneration, an excess quantity of salt is passed through the bed than is necessary to fully rejuvenate the resin particles in the bed. This results in a waste of salt.

SUMMARY OF THE INVENTION

The water softener system of the present invention employs a method of selecting the quantity of salt to be used during each regeneration of the system. The system employs automatic means to account for and efficiently use the water softener's residual capacity that results when the softener's resin bed is regenerated prior to complete exhaustion. The method of the present invention further maximizes the efficient use of the salt during each regeneration by selecting the quantity of salt needed to regenerate the resin bed to a preselected design capacity, which is less than the maximum or theoretical capacity of the resin bed. More specifically, the method of regenerating a water softener in accordance with the invention, includes an initial selection of a design exchange capacity to which the resin bed is to be regenerated during each regeneration cycle. This design exchange capacity is preferably approximately equal to the exchange capacity of the resin bed at a particular salt dosage wherein the exchange capacity of the bed at the particular salt dosage divided by the particular salt dosage is approximately 2850. It has been determined that such a design capacity makes efficient use of the salt in the brine solution during each regeneration cycle. The system is regenerated when at the end of any preselected time period, the percentage of the design capacity of the resin bed used since the last regeneration cycle exceeds a predetermined percentage. This percentage in accordance with the preferred embodiment of the invention is approximately 30 percent. The resin bed is regenerated with a brine solution having a salt dosage which is approximately equal to that which is necessary to regenerate the resin bed to its design capacity.

In determining the salt dosage used during a regeneration cycle in accordance with the invention, the exchange capacity of the resin bed is determined for various salt dosages. The exchange capacity of the resin bed for each salt dosage is approximately equal to the capacity of the resin bed when the resin bed is exhausted to one grain hardness and subsequently regenerated with the particular salt dosage. This procedure is repeated for different salt dosages to determine the exhange capacity of the resin bed at the various selected salt dosages.

The available exchange capacity of the resin bed is determined by subtracting the exchange capacity of the resin bed used since the last regeneration from the selected design capacity of the resin bed. The exchange capacity of the resin bed used since the last regeneration is determined by measuring the volume of water passing through the resin bed since the last regeneration and multiplying such volume by the hardness of such water. The salt dosage used during each regeneration cycle is then determined by subtracting the previously determined salt dosage of the resin bed at the available exchange capacity from the previously determined salt dosage of the resin bed at the design exchange capacity.

The apparatus in accordance with the invention utilizes a turbine water meter located in the soft water outlet line of the water softener to measure the water usage in gallons since the last regeneration. A microcomputer is provided which is programmed to receive an input from the water meter and automatically make the necessary calculations to determine when to regenerate the resin bed and to determine the proper salt dosage fill time to the brine tank prior to each regeneration. The micro-computer is programmed to receive and store the water hardness of the water being treated and to base its calculations thereon.

The regeneration of the resin bed of the water softener in accordance with the above method and apparatus restores the resin bed fully to its design capacity upon completion of each regeneration cycle of the water softener. The amount of salt dissolved in the brine tank prior to each regeneration is just enough to restore the resin bed to its design capacity. The water softener will always have at least 70 percent of its design capacity available for use at the beginning of each scheduled period of use.

DESCRIPTION OF PREFERRED EMBODIMENTS

Figure 1:
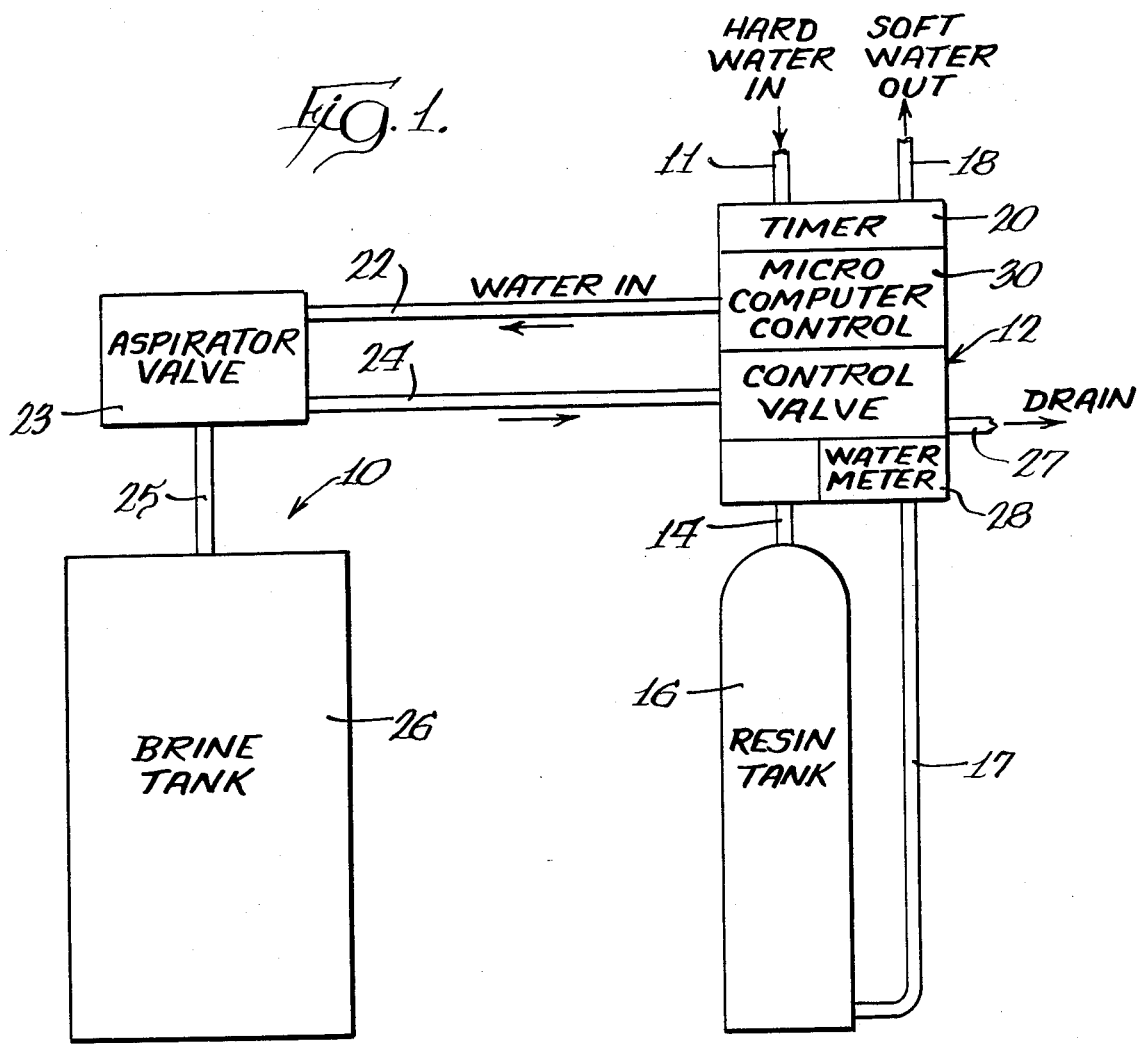
FIG. 1 is a schematic representation of an automatic water conditioning system of the general type which embodies the present invention.

Referring to FIG. 1, a water conditioning system of generally conventional construction is illustrated schematically at 10. The system 10 is designed to soften water when it is delivered to a residence, business, or the like, during a "service cycle" of the system. Periodically the system 10 is "regenerated" in a generally conventional manner by the use of a brine solution in a regeneration cycle or cycles. As is already evident, the present invention is primarily concerned with the control of the brine solution during the regeneration cycle.

During the service cycle, the raw or hard water from a suitable source is passed through a feed line 11 to a control valve 12. The control valve 12 directs the raw water through a line 14 to a resin tank 16 which contains a bed of the ion exchange particles. The raw water passes through the bed of particles and is withdrawn from the tank through a line 17. The treated water, which has been softened by contact with the ion exchange resin particles, passes through the line 17 to the control valve 12 once more and is directed by the control valve 12 to a service line 18.

In a manner that will be further discussed hereinbelow, after a quantity of raw water has passed through the resin tank 16, at a time when the ion exchange particles have begun to lose their capacity to effectively soften the raw water, regeneration is initiated by a timer 20. This regeneration conventionally includes cycles wherein the ion exchange particle bed is backwashed and rinsed. It further includes a brine cycle wherein the ion exchange particle bed is treated to flow through by a brine solution. The brine cycle is initiated by the timer 20 to actuate the control valve 12 and direct water through a bypass line 22 to an aspirator valve 23. This water is returned to the control valve from the aspirator valve 23 through a return line 24 but, in passing through the aspirator valve 23, it establishes a pressure reduction by Venturi effect in a brine line 25 from the brine tank 26. Brine is drawn by the partial vacuum and flows with the water through the line 24 and the control valve 12 into the line 17 and resin tank 16. The brine flowing through the bed of ion exchange resin particles removes the hardness inducing ions therefrom and carries them through the line 14 and the control valve 12 to the drain line 27. As long as there is brine available to the brine line 25 in the brine tank 26 and while a partial vacuum is maintaned therein, brine treatment of the ion exchange resin bed in the resin tank 16 continues. It is desirable, of course, to have precisely the amount of brine available which will efficiently regenerate the bed of ion exchange resin material which has been exhausted to a known extent. Accordingly, the present invention is directed to an improved method and apparatus for efficiently using the residual capacity remaining at the time of regeneration by precisely determining the quantity of salt to be used during each regeneration cycle.

The theoretical exchange capacity (G) of the bed of resin particles in resin tank 16 may be approximated as follows:

$$G = Q \times C_R$$

where:
 G=exchange capacity of the resin bed in grains
 Q=quantity of resin in cu. ft.
 $C_R$=34400 grains/cu. ft. (an empirically determined limiting capacity constant for the particular resin)

In accordance with the preferred method of the present invention, the bed of resin particles is regenerated during each regeneration cycle to a design capacity $C_{100}$, which is less than the theoretical capacity as determined above. The design capacity $C_{100}$ is selected at an exchange capacity of the bed where the salt efficiency (E) is generally equal to or greater than 2850, where E is approximated as follows:

$$E = C/S$$

where:
 C=exchange capacity of the rein bed at a particular salt dosage in grains
 S=salt dosage in lbs.

Figure 2:
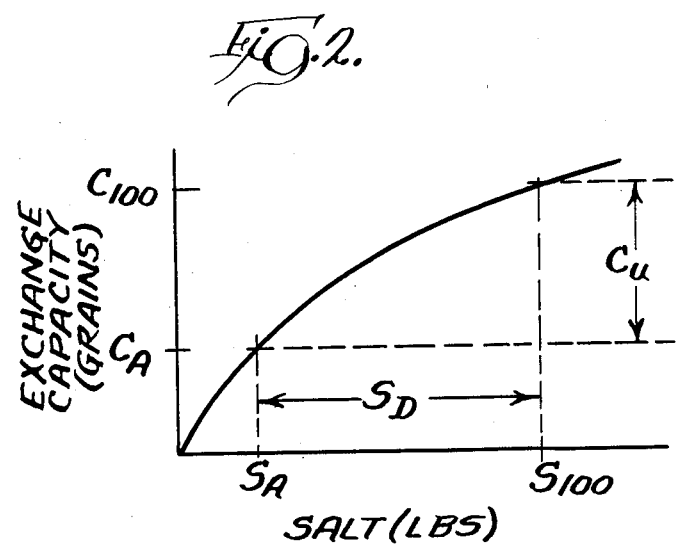
FIG. 2 is a graph which illustrates a curve representing the exchange capacity of a resin bed as a function of salt dosage.

Referring to FIG. 2, a graph is presented which illustrates for an exemplary resin bed the exchange capacity of the bed as a function of the salt dosage. The points along the curve generated in FIG. 2, corresponding to each salt dosage, is approximately equal to the exchange capacity of the resin bed when the resin bed is exhausted to one grain hardness and subsequently regenerated with that particular salt dosage. The preferred method for determining the exchange capacity of the resin bed for each particular salt dosage will now be described. The resin bed is first exhausted to one grain hardness by passing water through the bed until the effluent water exiting from the bed has a hardness of one grain. The resin bed is then regenerated with a regenerant brine solution having the selected pounds of salt (salt dosage). Water of a known hardness is passed through the resin bed until the effluent water exiting the bed reaches a hardness of one grain. The quantity of water passing through the resin bed is measured. The exchange capacity of the resin bed at each selected salt dosage is then calculated as follows:

$$C = G \times H$$

where:
 C=exchange capacity of resin bed at the particular salt dosage in grains
 G=gallons of water passing through the resin bed
 H=hardness of the water passing through the resin bed in grains The procedure is repeated for various salt dosages to generate the curve shown in FIG. 2.

As previously discussed, the design capacity of the resin bed $C_{100}$ is selected in accordance with the present invention at the point on the curve wherein the capacity of the resin bed (C) divided by the salt dosage (S) is generally equal to or greater than 2850. It has been determined that regenerating the resin bed to this exchange capacity level efficiently makes use of the volume of salt water used during each regeneration cycle of the resin bed.

By way of example, the exchange capacities (C) of a one cubic foot bed of sodium form strong acid cation exchange resin (i.e., Diamond Shamrock C-20) resin for various salt dosages (S) and the calculated salt efficiencies (E) is approximated as follows:

| S (in lbs.) | C (in grains) | E |
|---|---|---|
| 1 | 5,500 | 5,500 |
| 2 | 10,100 | 5,060 |
| 3 | 14,000 | 4,668 |
| 4 | 17,300 | 4,316 |
| 5 | 20,000 | 4,001 |
| 6 | 22,300 | 3,718 |
| 7 | 24,200 | 3,463 |
| 8 | 25,900 | 3,233 |
| 9 | 27,200 | 3,025 |
| 10 | 28,400 | 2,838 |
| 11 | 29,300 | 2,667 |
| 12 | 30,100 | 2,512 |
| 13 | 30,800 | 2,371 |
| 14 | 31,400 | 2,243 |
| 15 | 31,900 | 2,125 |
| 16 | 32,300 | 2,018 |
| 17 | 32,600 | 1,919 |
| 18 | 32,900 | 1,828 |
| 19 | 33,100 | 1,744 |
| 20 | 33,300 | 1,667 |

In accordance with the principles of the present invention, the design exchange capacity $C_{100}$ for the resin bed represented by the data above, would be approximately 28,000 grains. This is in contrast to a theoretical capacity of the resin bed which is generally in excess of 34,400 grains. Accordingly, as will be further discussed hereinbelow, the resin bed is regenerated during each regeneration cycle with a brine solution which has a salt dosage sufficient to bring the exchange capacity of the resin bed up to approximately 28,000 grains.

In accordance with the present invention the resin bed is regenerated when, at the end of any preselected time period, i.e. the end of a day, the percentage of the design capacity of the resin bed used since the last regeneration cycle exceeds a predetermined percentage (also herein referred to as the progress to exhaustion). This percentage in accordance with a preferred embodiment of the invention is approximately 30%. Put another way, at the beginning of each preselected time period, the available exchange capacity of the resin bed is at least 70% of the design capacity of the bed.

This progress to exhaustion percentage (P) may be determined as follows:

$$P = \frac{G \times H}{C_{100}} \times 100$$

where:
G = volume of water in gallons passing through the resin bed since the previous regeneration
H = hardness of the water passing through the resin bed in grains
$C_{100}$ = design exchange capacity of the resin bed The volume of water (G) passing through the resin bed may be determined in many ways well known in the art. An example of such a device is a water turbine meter 28, located in communication with the outlet line 18, which measures the volume of water passing through the outlet line 18. Meter 28 preferably utilizes a magnetic hall-effect switch circuit to pick up alternative N-S flux reversals as the turbine turns. The hardness of the water (H) passing through the bed may be determined by techniques well known in the art. The design exchange capacity $C_{100}$ of the resin bed is determined as discussed above.

The progress to exhaustion percentage is preferably continuously calculated by a specifically programmed micro-computer controller 30. The design capacity $C_{100}$ is pre-programmed into controller 30, the hardness of the water (H) is programmed into the controller by the operator, and the gallons used (G) is measured by the meter 28 and continuously fed to the controller 30. At the end of each preselected time period, the controller 30 initiates a regeneration cycle if the progress to exhaustion percentage (P) exceeds a preselected value, i.e. 30.

In accordance with a further feature of the invention, the quantity of salt used during each regeneration cycle $S_D$ is selected in accordance with the amount of salt needed to bring the resin bed back up to its design exchange capacity. Referring to FIG. 2, the design exchange capacity is indicated at $C_{100}$ and the salt dosage to restore the resin bed to attain the $C_{100}$ is indicated at $S_{100}$. The available exchange capacity of the resin bed is indicated at $C_A$ and is determined as follows:

$$C_A = C_{100}\left(1 - \frac{P}{100}\right)$$

where:
P = percentage of exhaustion (as determined above)
$C_{100}$ = design capacity (as determined above)
The exchange capacity of the resin bed used since the last regeneration cycle is indicated at $C_u$ and is determined as follows:

$$C_u = C_{100} - C_A$$

where:

$C_{100}$ = design capacity (as determined above)
$C_A$ = available exchange capacity (as determined above)

The quantity of salt, or salt dosage, used during the regeneration cycle, as indicated at $S_D$, is determined as follows:

$$S_D = S_{100} - S_A$$

where:
$S_{100}$ = salt quantity to attain $C_{100}$ in the resin bed starting from a 1 grain hardness condition
$S_A$ = salt quantity to attain $C_A$ in the resin bed starting from a 1 grain hardness condition The selection of the quantity of salt dosage ($S_D$) used during the regeneration cycle, as determined in accordance with the above, efficiently utilizes the salt to regenerate the resin bed to its design capacit $C_{100}$.

After determining the quantity of salt $S_D$ as discussed above, the controller 30 controls the fill time of the fill water entering the brine tank 26 to dissolve a quantity of salt substantially equal to $S_D$ as determined. The resin bed is then regenerated in a manner previously discussed to restore the capacity of the resin bed to its design capacity $C_{100}$.

In accordance with the teachings of the invention, as discussed hereinabove, it is contemplated that the controller 30 may be programmed to operate in various ways. The controller 30 may be programmed to initiate a regeneration cycle with one of a plurality of preselected salt dosages. For example, the control 30 may be programmed to regenerate with salt dosages of 9, 11, 13 or 15 lbs of salt. In such instance the control 30 may be programmed to select the sale dosage which is either closest to the actual salt dosage necessary to achieve the design capacity of the resin bed or the highest dosage which will not exceed the actual salt dosage necessary to achieve the design capacity of the resin bed. In either case, the salt dosage selected will regenerate the resin bed to approximately its design exchange capacity.

The present invention provides an automatic means to account for and efficiently use the water softener's residual capacity, which results when the softener is regenerated before complete exhaustion of the resin bed. The regenerations may be scheduled to start at 24 hour intervals in the case of models intended for single unit installation and at, for example, 8 hour intervals for models intended for multi-unit installation. In either case, the micro-computer controller evaluates the total water usage since the previous regeneration and determines the quantity of salt to be used to regenerate the resin bed to its design capacity. In the instance when the micro-computer controller determines that less than 30 percent of the softener's design capacity has been used, then no regeneration will occur during that period. The main benefits of this feature is that it assures a capacity of 70 to 100 percent at the start of each period and results in savings of salt and regeneration water consumption.

It should be understood, of course, that the foregoing relates to only preferred embodiments of the invention and that numerous modifications or alterations may be made therein without departing from the spirit and the scope of the invention as set forth in the appended claims.

What is claimed is:
1. A method of regenerating the bed of exchange resin in a water softener by selecting the proper salt dosage for each regeneration cycle, said method comprising the steps of:
  (a) determining the approximate exchange capacity of the bed of resin as a function of a plurality of different salt dosages;
  (b) selecting a predetermined design exchange capacity to which the bed of resin is to be regenerated during the regeneration cycle;
  (c) determining the approximate available exchange capacity of the bed of resin immediately prior to regeneration;
  (d) determining the salt dosage determined in step (a) at the predetermined design exchange capacity;
  (e) determining the salt dosage determined in step (a) at the approximate available exchange capacity determined in step (c);
  (f) determining the salt dosage for regenerating the bed of resin by subtracting the salt dosage determined in step (e) from the salt dosage determined in step (d); and
  (g) passing a brine solution through the bed of resin in said water softener, said solution having the salt dosage determined in step (f).

2. The method as defined in claim 1 wherein the approximate exchange capacity of a predetermined number of different salt dosages are determined in step (a) and the salt dosage determined in step (e) is determined by selecting the salt dosage at the closest exchange capacity as determined in step (a) which does not exceed the approximate available exchange capacity.

3. The method as defined in claim 1 wherein the approximate exchange capacity of a predetermined number of different salt dosages are determined in step (a) and the salt dosage determined in step (e) is determined by selecting the salt dosage at the exchange capacity as determined in step (a) which is closest to the approximate available exchange capacity.

4. The method as defined in claim 1 wherein the exchange capacity of the bed of resin as determined in step (a) for each of the different salt dosages is approximately equal to the exchange capacity of the bed of resin when the bed is exhausted to one grain hardness and subsequently regenerated with the particular salt dosage.

5. The method as defined in claim 1 wherein the design exchange capacity selected in step (b) is approximately equal to the exchange capacity of the bed of resin as determined in step (a) at the level wherein the exchange capacity divided by the salt dosage is approximately 2850.

6. The method as defined in claim 1 wherein the approximate available exchange capacity of the bed resin in step (c) is determined by substacting the capacity of the bed of resin used since the last regeneration from the predetermined design capacity as selected in step (b).

7. The method as defined in claim 6 wherein the capacity of the bed of resin used since the last regeneration is approximately equal to the volume of water passing through the bed of resin since the last regeneration multiplied by the hardness of the water passing through the bed of resin.

8. A method of regenerating a water softener having a bed of exchange resin through which water is passed therethrough, comprising the steps of:
  (a) selecting a predetermined design exchange capacity to which the bed of resin is to be regenerated during the regeneration cycle;
  (b) determining the percentage of the design capacity of the bed of resin used since the last regeneration;
  (c) regenerating the bed of resin when the percentage as determined in step (b) exceeds a preselected percentage by passing a brine solution through the bed of resin having a salt dosage selected by:
    (i) determining the approximate exchange capacity of the bed of resin as a function of a plurality of different salt dosages;
    (ii) determining the approximate available exchange capacity of the bed of resin immediately prior to regeneration;
    (iii) determining the salt dosage determined in step (i) at the predetermined design exchange capacity;
    (iv) determining the salt dosage as determined in step (i) at the approximate available exchange capacity determined in step (ii); and
    (v) substracting the salt dosage of step (iv) from the salt dosage of step (iii).

9. The method as defined in claim 8 wherein the bed of resin is regenerated when the percentage as determined in step (b) exceeds the preselected percentage at the end of a preselected time period.

10. The method as defined in claim 9 wherein the preselected percentage is approximately 30%.

* * * * *